4 Sheets—Sheet 1.
S. COLT.
Revolving Gun.
No. 124.
Reissue Oct. 24, 1848.
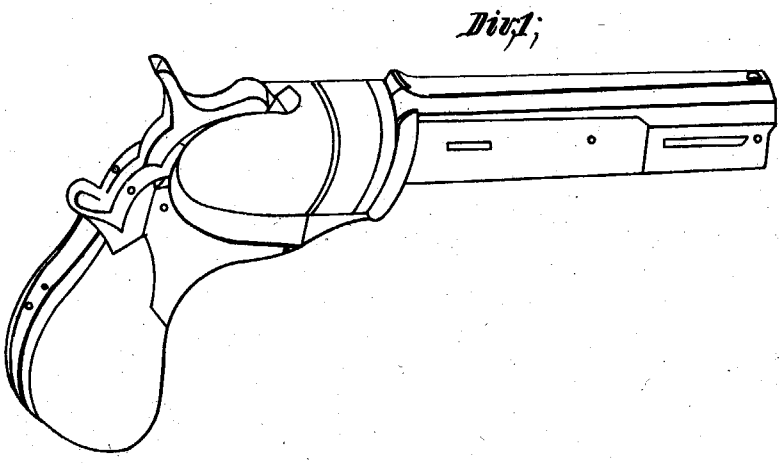

4 Sheets—Sheet 2.
S. COLT.
Revolving Gun.
No. 124.
Reissue Oct. 24, 1848.
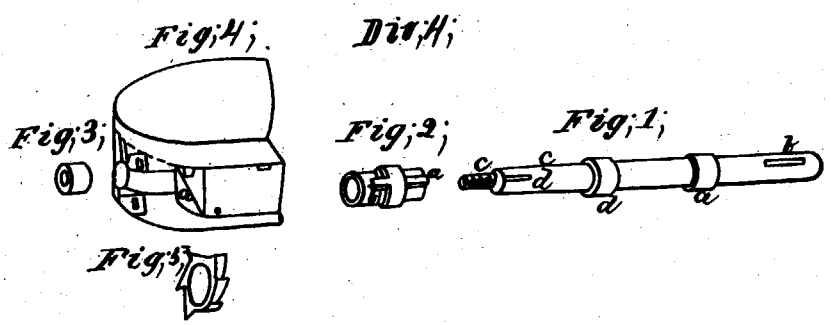

S. COLT.
Revolving Gun.
No. 124.
Reissue Oct. 24, 1848.
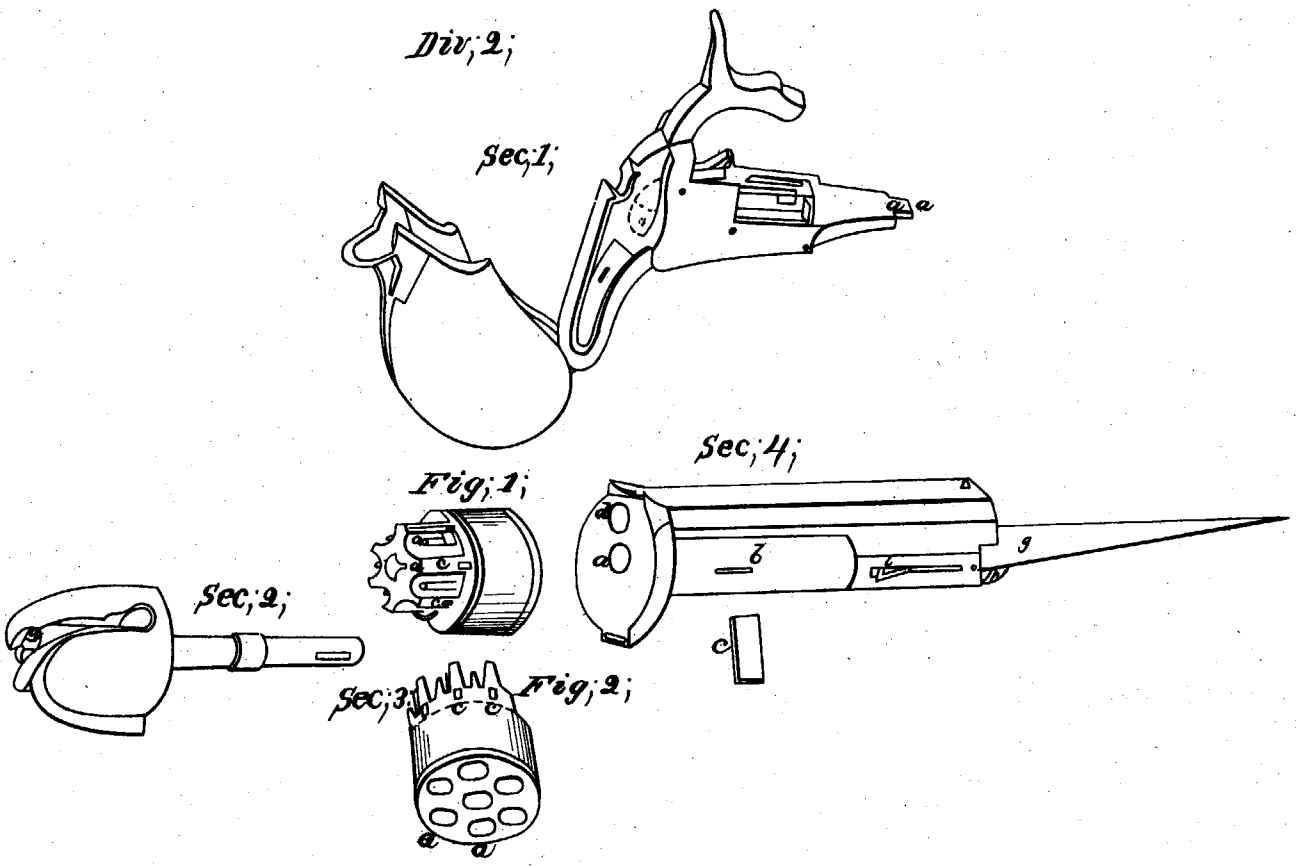

S. COLT.
Revolving Gun.
No. 124.
Reissue Oct. 24, 1848.
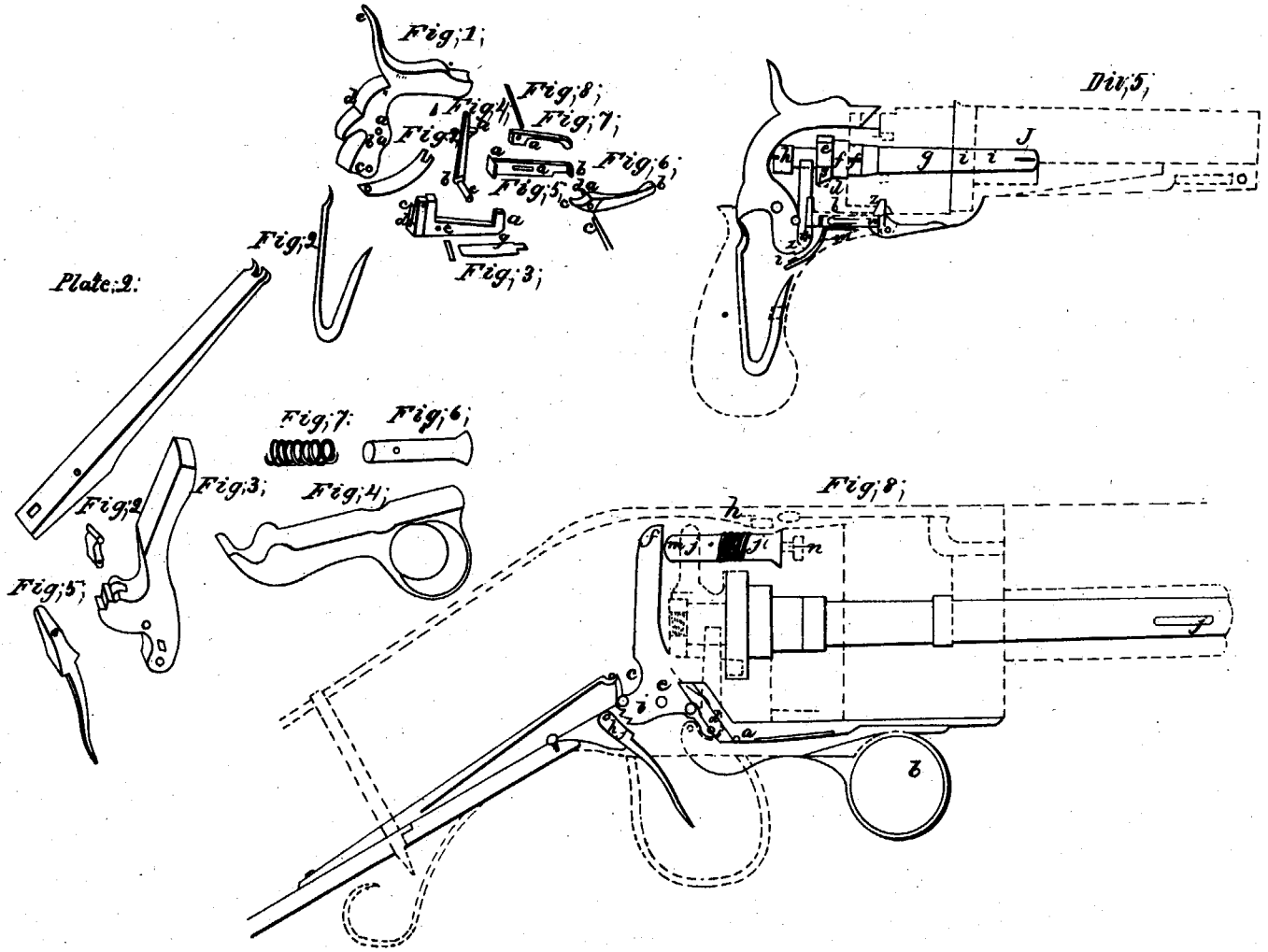

UNITED STATES PATENT OFFICE.

SAMUEL COLT, OF HARTFORD, CONNECTICUT.

IMPROVEMENT IN REVOLVING FIRE-ARMS.

Specification forming part of Letters Patent No. 138, dated February 25, 1836; Reissue No. 124, dated October 24, 1848.

*To all whom it may concern:*

Be it known that I, SAMUEL COLT, of the city of Hartford and State of Connecticut, have invented certain Improvements in Fire-Arms, (for which Letters Patent were granted, bearing date the 25th day of February, 1836,) of which the following is a specification.

My invention relates to that class of fire-arms in which a series of parallel chambers for containing the charges are made in a rotating breech, so placed in connection with the barrel that by the rotation of the said breech the charges are in succession brought in a line with the barrel for discharge.

The principle or mode of operation which distinguishes my invention from all other things before known consists, first, in combining the rotating breech with the lock in such manner that by operating the cock the breech shall be rotated to bring the charges in succession to the line of the barrel for the discharge; second, in combining the rotating chambered breech with the lock by means of a catch or its equivalents in such manner that by the operation of cocking the said rotating breech shall be liberated to admit of being turned, and when turned relocked to hold the particular chamber to be discharged in place during the discharge; third, in combining with the rotating breech a series of nipples, one for each chamber, to receive percussion-caps, that the several touch-holes may be protected by the caps from the effects of the lateral fire when this is combined with the placing of such in recesses or between partitions as a means of protecting the caps, and as a further protection to the touch-holes from the effects of the lateral fire; fourth, connecting the barrel with the recoil-shield at the back of the rotating chambered breech by means of an arbor or spindle on which the barrel rotates, and a wedge-key or its equivalent to admit of readily connecting and disconnecting the parts; and, fifth, also connecting the barrel with the shield by means of the lock-plate below the rotating breech.

Division 1 of the drawings represents a pistol. Division 2 represents Division 1 in four sections, as 1, 2, 3, and 4. Division 3 represents all the parts in Section 1 of Division 2. Division 4 represents all the parts of Section 2 of Division 2. Division 5 represents the mechanical combination of the entire instrument.

Figure 1 of Division 3 represents the hammer which discharges the percussion-caps. It acts upon a fulcrum at *a*. *b* is a pin, projecting from the hammer, which serves to operate the key that locks the cylinder when its respective chambers are brought directly opposite the barrel. *c* represents the hole which receives the lower arm of the lifter that turns the cylinder. *d* represents the part of the hammer where the mainspring acts upon it. *e* is a projection by which the hammer is drawn back.

Fig. 2 is the mainspring.

Fig. 3 is the key-hole or catch-lever that holds the cylinder in its place by the arm *a* when each chamber is brought opposite the barrel. *b* is a spring, which is attached to the part *c*, which has a lateral motion to the right by means of a hinge at *d*, and serves to allow the pin *b* in Fig. 1 to pass it. The fulcrum of the key-bolt or catch-lever is at *e*. *f* is the fulcrum-pin. *g* is the spring which forces the key into the wards of the cylinder.

Fig. 4 is the lifter or hand, with the spring on the left side to allow it to move laterally to the left when acted on at *a* by each tooth of the ratchet. At *b* is a joint which connects it with the pin *c*, which acts in the hole *e*, in Fig. 1.

Fig. 5 is the connecting-rod. The end *a* serves as a sear or catch to the hammer when the lock is set, and when the hammer is pulled back the rod moves forward horizontally in consequence of the hammer's coming in contact with it, and the end *b* operates upon the trigger, Fig. 6, at the catch *a*, and throws down the end *b*, by which means the claw *c* hooks into the end *b* of Fig. 5, and is held in its place by the spring, Fig. 7, acting upon it at the pin *d*.

Fig. 8 is the pin which holds in their places the spring, Fig. 7, at *a*, and the connecting-rod, Fig. 5, at *c*. Fig. 6 moves on the pin *c* at *f*.

Fig. 9 is a spring which holds the rod, Fig. 5, toward the hammer, that the connecting-rod may catch in a notch at the bottom of the hammer to hold it when set.

Division 4 is a dissection of Section 2. Fig.

1 is the arbor on which the cylinder revolves. *a a* are the bearings on which the cylinder rests. *b* is the slot through which a key enters to connect Section 4 with it. The part *c* passes through the shackle, Fig. 2, which is keyed to the cylinder, Section 3, Fig. 1, at the groove *a* by means of the tongue or projection *a* on the shackle. *e* is the part which receives the nut, Fig. 3, when it is connected with the shackle, Fig. 4, as seen at *a*, Section 2, in Division 2.

Fig. 5 is the ratchet, which is placed in the middle of the shield, at *a*, and receives the shackle, to which it is connected by the tongue or projection *b*. The arbor is prevented from turning in the shield by means of pin or key in the shield, which enters the groove *d* on the arbor.

Fig. 2, Section 3 of Division 2, represents the fore part of the cylinder. The holes *a a*, &c., represent the ends of the chambers for the charges. *b* is the hole through which the arbor on which the cylinder revolves passes. *c c*, &c., represent the wards to receive the end *a* of the key, bolt, or catch-lever, Fig. 3, Division 3, to prevent the cylinder from turning when a charge is brought opposite the barrel.

*b b*, &c., Fig. 1, represent the tubes or nipples, on which are placed the percussion-caps. *c c*, &c., are partitions which prevent the communication of fire or smoke from one cap to another.

In Division 2, Section 4, *a* represents the hole through which the arbor passes, and *b* a mortise for the key *c* to connect this section with the arbor. At *d* the ball enters the barrel from the chamber. At *e* the barrel is fastened to the plate. At *f* is a groove in the plate to receive the end *a* of the lock-plate of Section 1, which serves to steady it. *g* represents the bayonet, hung on a pin at *h*, *i* being a catch to hold it in its place when it is thrown out.

In Division 5 the hammer is hung at the fulcrum *a*. The key, bolt, or catch-lever which holds the cylinder is hung at the fulcrum *b*. The lifter that works the ratchet has a working connection with the hammer on the left side at *c*. The arm *d* of the lifter works into the teeth of the ratchet on the left. *e* represents the ratchet when connected with the shackle. *f f* is the middle and forward part of the shackle on which the ratchet is placed. *g* is the arbor on which the cylinder revolves. The end *h* is the nut that holds the pin in its place when in the shield. *i i* represent the forward end of the arbor, which passes through the plate and the projection on the lower part of the barrel, and by a key at *j* it is secured to the barrel. *k* represents the fulcrum of the trigger. *l* is the spring which forces the connecting-rod against the end of the hammer. *m* is the spring which forces the key that holds the cylinder. *o* is the mainspring. By drawing back the hammer the pin *p* operates upon the after end of the key, bolt, or catch-lever that locks the cylinder and raises it. Consequently the other end, *r*, is drawn from the cylinder, and the arm *d* of the lifter commences to act on a tooth, *s*, on the left side of the ratchet, which, being connected to the cylinder by means of the shackle, turns it until the next chamber is brought opposite to the barrel. When the pin *p* is relieved from the key by passing over its upper end, *t*, the pin allows the end *r* of the key to be forced, by means of the spring *m*, into the succeeding ward of the cylinder. At the same time, by the action of the lower end of the hammer *u* upon the connecting-rod *v*, it produces a forward horizontal motion of the rod, when the end *w* is brought in contact with the upper projection of the trigger and forces it down to a proper position for the finger, when a claw, at *x*, of the trigger hooks into the connecting-rod, which holds the hammer, when drawn back or set, by means of the end *v* entering the lower catch, *y*, on the hammer.

To discharge the pistol, by pulling the trigger the connecting-rod is drawn from the catch of the hammer, when the mainspring forces the hammer forward, the upper end of which strikes the percussion-cap, during which the lifter, by means of its lateral motion to the left, falls below a succeeding tooth on the ratchet, when, by means of the lateral motion of the after end *q* of the key which holds the cylinder, the pin *p* of the hammer is permitted to fall below it again. By repetitions of the same motion of the hammer the same effect is produced until each succeeding chamber is discharged.

Plate 2 represents the principle of the invention as applicable to rifles, muskets, and other fire-arms differing from what has already been described, first, in the manner of setting the lock; secondly, in the use of an adopter for communicating the force of the hammer to the percussion-cap; thirdly, in the situation of the main-spring and trigger; and, fourthly, in the construction of the lock-plate and guards that hold the stock.

Fig. 1 represents the mainspring. Fig. 2 is the stirrup to connect the mainspring with the hammer. Fig. 3 is the hammer. Fig. 4 is a secondary lever for setting the lock. Fig. 5 is the discharging-trigger. Fig. 6 is the adopter. Fig. 7 is the spiral spring to draw back the adopter. Fig. 8 represents all the parts combined.

To set the lock, the fulcrum of the secondary lever being at *a*, by drawing down on the end *b* the end *c* operates upon the end *d* of the hammer, whose fulcrum, being at *e*, throws back its end *f*, when the trigger at *g* (whose fulcrum is at *h*) operates upon the catches of the hammer at *i* to hold the lock when set. When the end *f* of the hammer is removed from the adopter (whose bearings are at *j j*) it is drawn back by means of the coiled spring *k* until its end *l* is drawn back sufficient to allow the cylinder to turn, which is effected as described in the pistol. After the finger is relieved from the lever, when the lock is set, a small spring draws it back to its former place to make room for the end *d* of the hammer, so that its force may not be impaired. By pulling the trigger from the catch of the hammer the mainspring (which is connected to the hammer by the stirrup *o*) forces its end *f* forward against the end *m* of the adopter, the end *l* of which is brought in contact with the percussion-caps placed upon the tube *n*, which discharges the load. To load it it is only requisite to draw the key *j*, which will liberate Section 4. Then by drawing the key that locks the cylinder, which may be effected by drawing back the hammer, the cylinder may be taken from the arbor.

Among the many advantages in the use of these guns, independent of the number of charges they contain, are, first, the facility in loading them; secondly, the outward security against dampness; thirdly, security of the lock against the smoke of the powder; fourthly, the use of the partitions between the caps, which prevent fire communicating from the exploding cap to the adjoining ones; fifthly, by the hammers striking the cap at the end of the cylinder no jar is occasioned, deviating from the line of sight; sixthly, the weight and location of the cylinder, which give steadiness to the hand; seventhly, the great rapidity in the succession of discharges, which is effected merely by drawing back the hammer and pulling the trigger.

It will be obvious from the foregoing that the parts of my invention may be variously modified. For instance, instead of forming the ratchet-teeth by which the chambered breech is turned on a separate piece and connecting it with the breech by a shackle, the ratchet-teeth, or the equivalent thereof, may be made directly on a projection of the breech, or in the end thereof, or in a cavity therein, or on any part connected with the breech, as convenience may dictate.

Instead of connecting the lifter or hand that turns the chambered breech directly with the hammer or cock, it may be connected therewith by an intermediate lever or levers, or by an intermediate link, and the secondary lever may be used for operating the hammer, and instead of turning the breech by the upward motion of the lifter this may be reversed.

Although I have described the hammer as operated by a projection thereon when applied to a pistol and by a secondary lever when applied to guns, I do not wish to confine myself to these dispositions of the parts, as the secondary lever can be applied to the pistol-lock, and the gun-lock can be used as in the pistol without the secondary lever.

The parts not claimed as parts of my invention may be constructed or arranged in any manner desired so long as they are made dependent on and contribute to the general purposes of my invention, and so of the other parts. They may be varied in form and position so long as the principles and characteristics of my invention are retained; and although I have pointed out some of the modifications of which the principles of my invention are susceptible, I do not wish to confine myself to these, as other modifications may be made.

What I claim as my invention, and desire to secure by Letters Patent, is—

1. Combining a rotating chambered breech with the lock in the manner substantially as herein described, so that by the operation of lifting the hammer to cock the lock the said breech shall be rotated to the extent required to bring a loaded chamber in the line of the barrel preparatory to the discharge, substantially as described.

2. Combining the rotating breech with the lock by means of a key, catch, lever, or the equivalent thereof, substantially as specified, so that by the act of lifting the hammer to cock the piece the said breech shall be liberated to admit of its being rotated, and then relocked, that it may be held in the proper position during the discharge, substantially as described.

3. Placing the nipples of the rotating breech in recesses made in the rotating breech or between partitions, substantially as described, as a protection to the caps or touch-holes from the effects of lateral fire, as described.

4. Connecting the barrel with the recoil-shield at the back of the rotating chambered breech by means of an arbor or spindle (on which the breech rotates) and a wedge-key, substantially as described.

5. Connecting the barrel with the recoil-shield by means of the lock-plate below the rotating breech, substantially as described, in combination with arbor or spindle connection, as described, whereby the parts are held together firmly, while at the same time they admit of a quick and easy disconnection.

SAML. COLT.

Witnesses:
L. C. DORRY,
RICHD. J. A. CULVERWELL.